US012546159B2

(12) United States Patent
Christian et al.

(10) Patent No.: US 12,546,159 B2
(45) **Date of Patent: *Feb. 10, 2026**

(54) AUTOMATED TRANSACTION MACHINE WITH UNITARY STRUCTURE

(71) Applicant: Diebold Nixdorf, Incorporated, North Canton, OH (US)

(72) Inventors: Todd Christian, Dalton, OH (US); Daniel P. Schoeffler, North Canton, OH (US); Terry L Schreffler, North Canton, OH (US); Doug Kovacs, North Canton, OH (US)

(73) Assignee: Diebold Nixdorf, Incorporated, North Canton, OH (US)

( * ) Notice: Subject to any disclaimer, the term of this patent is extended or adjusted under 35 U.S.C. 154(b) by 365 days.

This patent is subject to a terminal disclaimer.

(21) Appl. No.: 17/621,474

(22) PCT Filed: Jun. 23, 2020

(86) PCT No.: PCT/US2020/039131

§ 371 (c)(1),
(2) Date: Dec. 21, 2021

(87) PCT Pub. No.: WO2020/263821

PCT Pub. Date: Dec. 30, 2020

(65) Prior Publication Data

US 2022/0349240 A1 Nov. 3, 2022

Related U.S. Application Data

(60) Provisional application No. 62/866,284, filed on Jun. 25, 2019.

(51) Int. Cl.
*E05G 1/024* (2006.01)
*E05G 1/06* (2006.01)
(Continued)

(52) U.S. Cl.
CPC ............... *E05G 1/024* (2013.01); *E05G 1/06* (2013.01); *G07D 11/125* (2019.01); *G07F 19/205* (2013.01)

(58) Field of Classification Search
CPC .. E05G 1/02; E05G 1/024; E05G 1/06; G07D 11/125; G07D 11/13; G07F 19/205
See application file for complete search history.

(56) References Cited

U.S. PATENT DOCUMENTS 4,272,137 A 6/1981 Rothhaas
4,373,450 A 2/1983 Miller
(Continued)

FOREIGN PATENT DOCUMENTS

BR 1106873 A2 10/2013
WO WO2013094830 * 6/2013 ............ E05G 1/024
WO WO-2013094830 A1 * 6/2013 ............ E05G 1/024

OTHER PUBLICATIONS

International Search Report filed in the corresponding PCT Application dated Aug. 6, 2020; 2 pages.
(Continued)

*Primary Examiner* — Christopher J Boswell
(74) *Attorney, Agent, or Firm* — Black McCuskey

(57) ABSTRACT

An automated transaction machine includes upper and lower units. The lower unit has a chest with a main body. The main body of the lower unit forms a cavity and has interior and exterior walls, made of different metals, metal alloys or composite metallic material. There is a non-metallic material layer disposed therebetween. There is opening for passage of documents or other items between the upper and lower units. The upper unit has a housing with a main body. The main body forms a cavity. The main body of the upper unit has an interior and an exterior wall. A transport system
(Continued)

may be disposed in the housing to transport documents between the upper and lower units.

12 Claims, 12 Drawing Sheets

(51) Int. Cl.
*G07D 11/125* (2019.01)
*G07F 19/00* (2006.01)

(56) References Cited

U.S. PATENT DOCUMENTS 4,615,280 A * 10/1986 Shoop ..................... G07F 19/20 106/644
6,527,172 B1 3/2003 Lewis
8,555,794 B2 * 10/2013 Tamura ................. G07F 9/0235 109/78
8,567,665 B2 * 10/2013 Boyes ..................... E05G 1/024 235/379
9,127,495 B2 * 9/2015 Romero .................. E05G 1/026
9,582,972 B2 * 2/2017 Tavares De Pinho .. E05G 1/024
10,636,258 B1 * 4/2020 Mercer ................... E05G 1/024
11,313,169 B2 * 4/2022 Meyer ..................... E05G 1/024
2012/0186086 A1 7/2012 Tavares De Pinho
2013/0036952 A1 * 2/2013 Hughes, Jr. ............... E04C 2/22 109/80
2013/0075467 A1 3/2013 Graef et al.
2020/0118396 A1 * 4/2020 Neufeld ................ G07F 19/205
2021/0166531 A1 * 6/2021 Neufeld .................. E05G 1/024
2022/0349241 A1 * 11/2022 Christian .............. G07F 19/209

OTHER PUBLICATIONS

Written Opinion filed in the corresponding PCT Application dated Aug. 6, 2020; 7 pages.
International Preliminary Report on Patentability filed in the corresponding PCT Application dated Dec. 28, 2021; 8 pages.
Office Action issued in corresponding case filed in Saudi Arabia Dec. 16, 2022; 8 pages.

* cited by examiner

AUTOMATED TRANSACTION MACHINE WITH UNITARY STRUCTURE

CROSS-REFERENCE TO RELATED APPLICATIONS

This application is a National Phase filing of International Application Ser. No. PCT/US20/39131, for an AUTOMATED TRANSACTION MACHINE WITH UNITARY STRUCTURE, filed 23Jun. 2020, which claims priority to and the benefit of U.S. Provisional Patent Application No. 62/866,284, filed 25 Jun. 2019, the contents of which are hereby incorporated by reference in their entirety.

BACKGROUND

This relates in general to automated transaction machines. Typically, automated transaction machines include an upper unit and a lower unit. The lower unit is often a safe or secure portion for securing notes of value or other documents or items. The upper unit often includes various components necessary to interface with a user and conduct commercial transactions. The United States and many European countries have various standards for automated transaction machines, for example, in the United States there are some applicable standards set by The Underwriters Laboratories (UL) and in Europe, The European Committee for Standardization (CEN). Some of these standards are related to safety ratings for safes in order to categorize the nature and quality of the products. These safety standards may include, for example, resistance to damage by fire, explosives, rain, and wind, as well as resistance to theft. Some relevant safety standards for Automated Transaction Machines include but are not limited to UL-291 and CEN I.

SUMMARY

This relates more specifically to a structure for an automated transaction machine. The automated transaction machine structure has a lower unit including a chest with a main body. The main body includes a cavity and both an interior and an exterior wall, wherein the interior and exterior walls are made of different metals, metal alloys or composite metallic material. The interior and exterior walls are separated by a layer of non-metallic material, such as concrete, disposed therebetween. The lower unit further defines a first opening for the passage of documents. The automated transaction machine structure further includes an upper unit with a housing having a main body, wherein the main body forms a cavity. The main body has an interior and an exterior wall, a second opening, and a transport system disposed therein to transport documents between the upper and lower units through the opening of the lower unit. The upper unit may further include an air conditioning unit disposed therein.

In at least one embodiment, an automated transaction machine is provided that adheres to both the UL and CEN respective safety standards for such an automated transaction machine.

DETAILED DESCRIPTION

Figure 1:
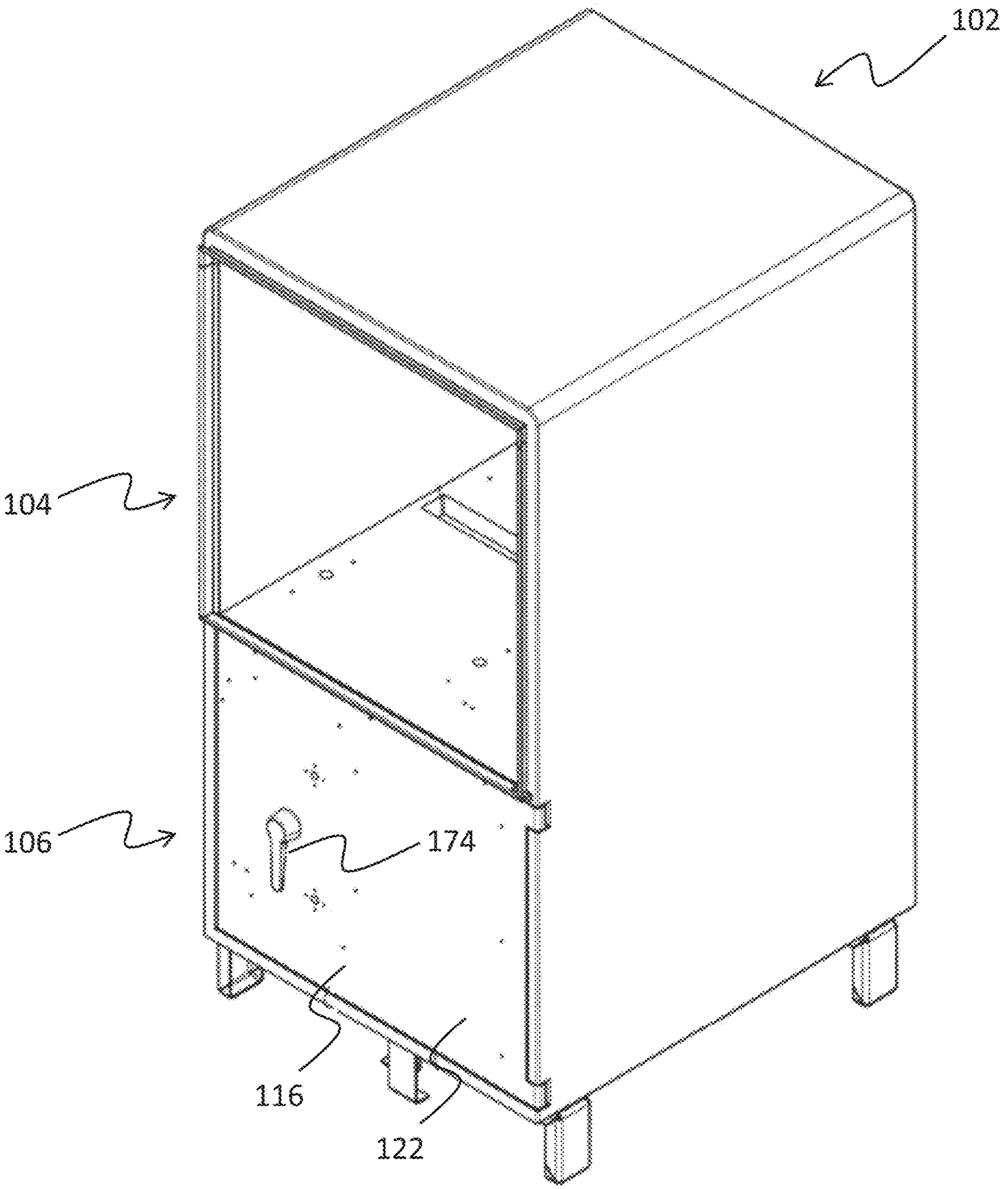
FIG. 1 is top right isometric view of an automated transaction machine structure including an upper unit and a lower unit.
Figure 2:
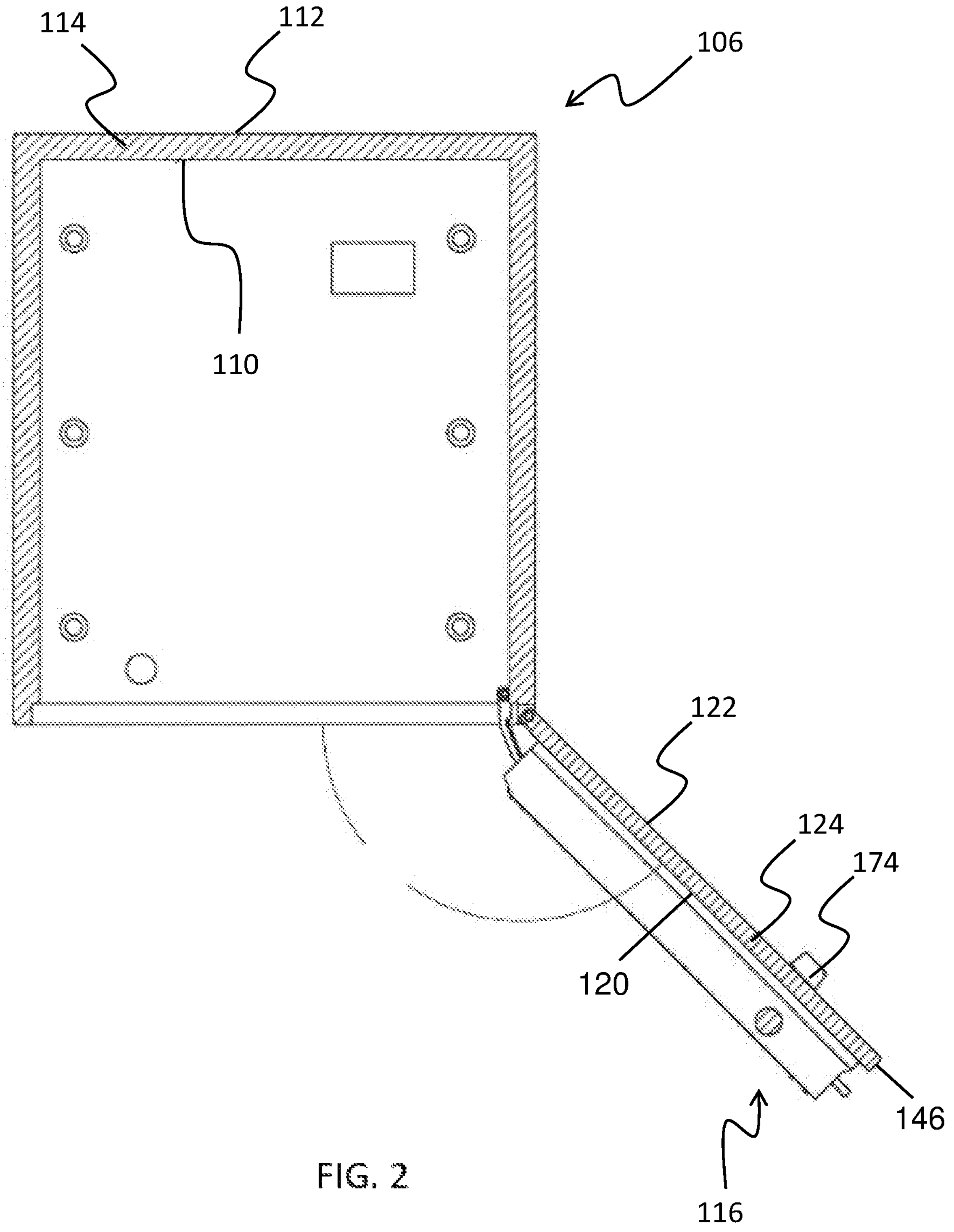
FIG. 2 is a cross sectional top view of a bottom portion of the lower unit of the automated transaction machine structure of FIG. 1.
Figure 3:
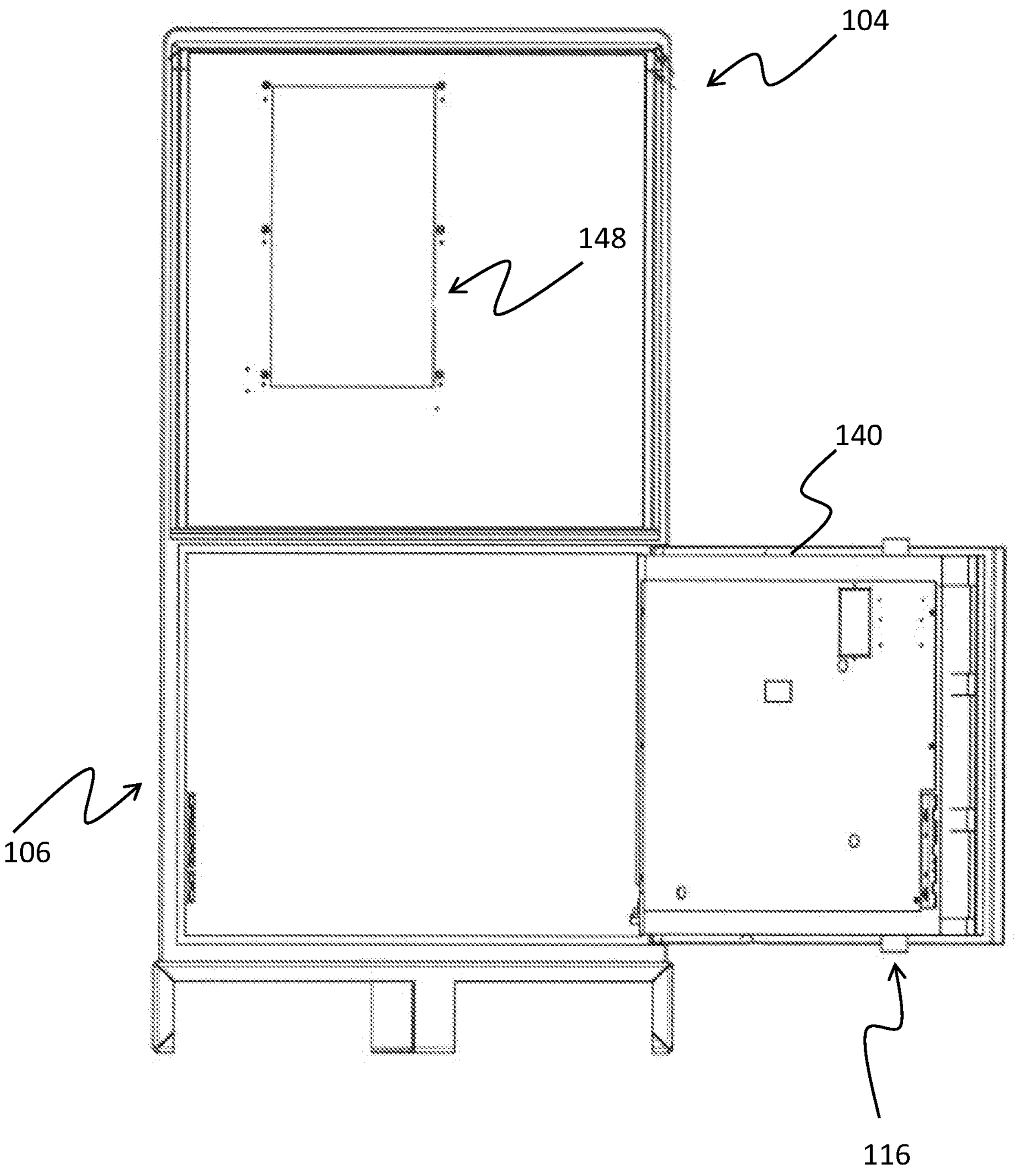
FIG. 3 is a front view of the automated transaction machine structure of FIG. 1.
Figure 4:
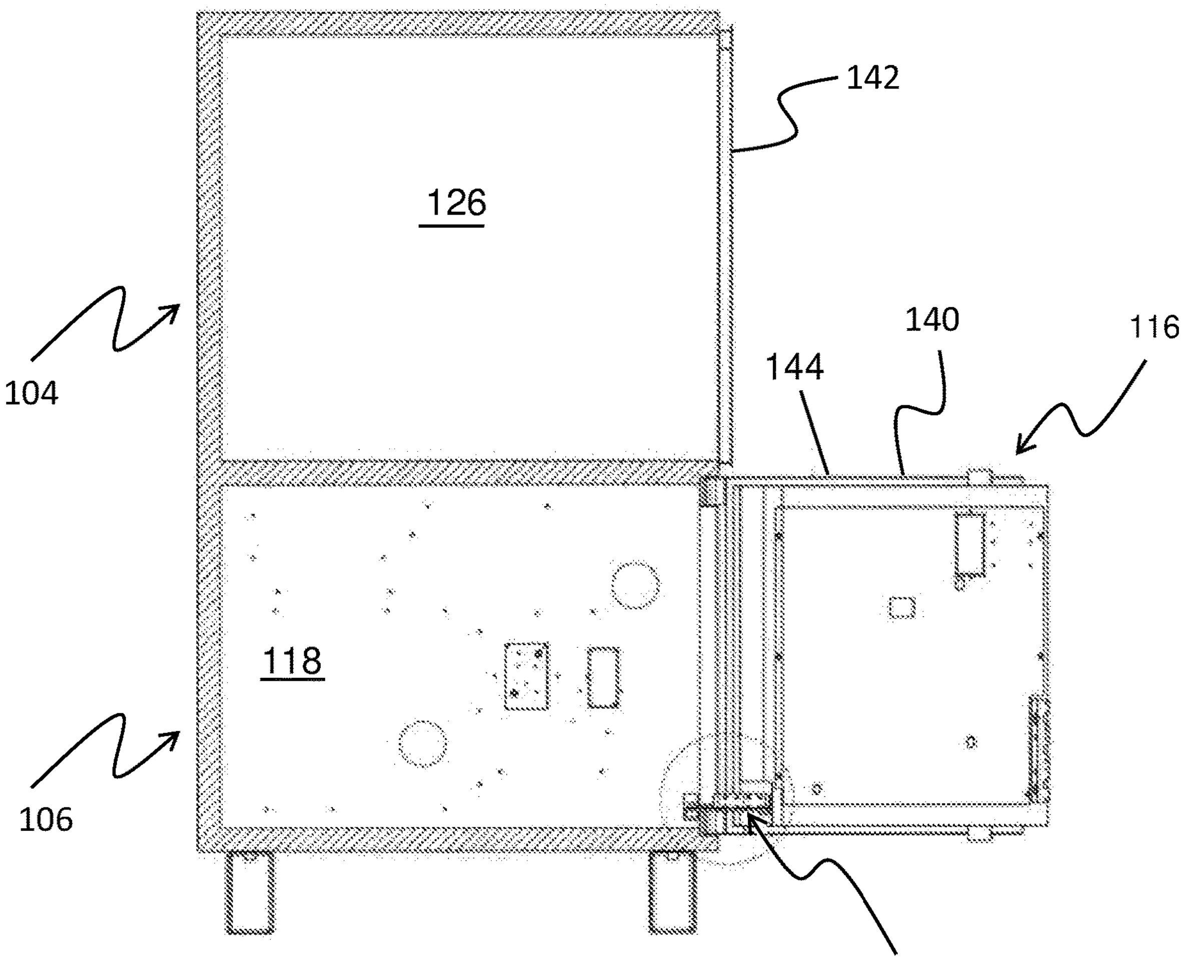
FIG. 4 is a cross sectional left side view of the automated transaction machine structure of FIG. 1.
Figure 4A:
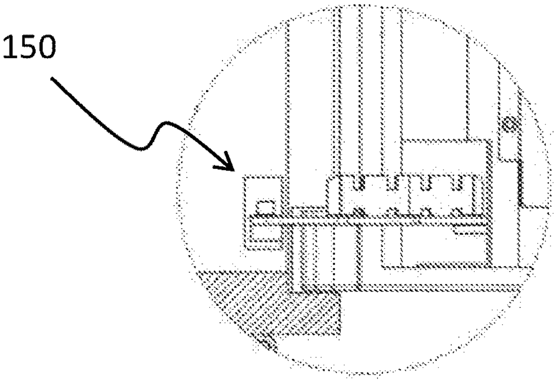
FIG. 4*a* is an enlarged view of a portion of FIG. 4.
Figure 5:
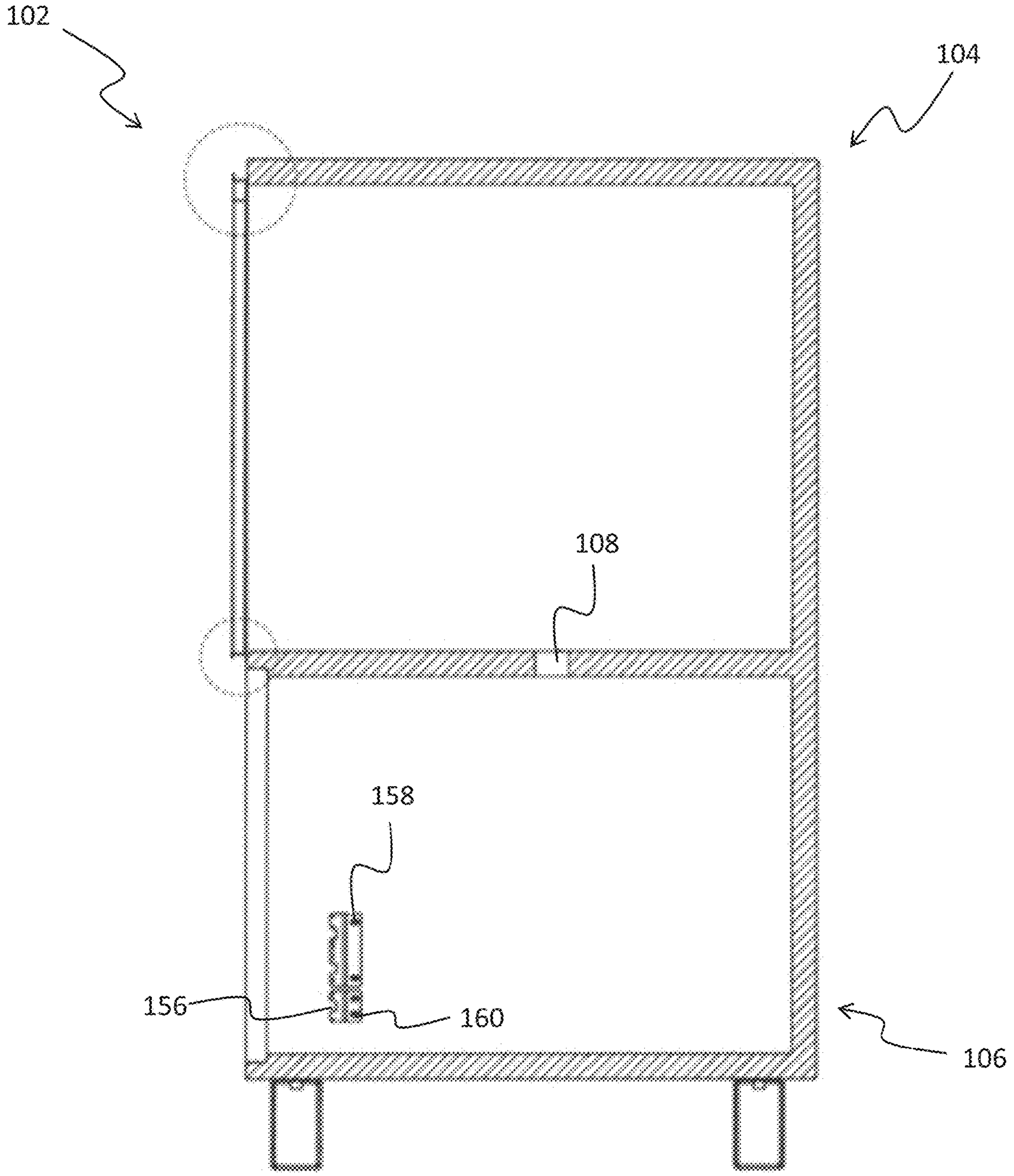
FIG. 5 is a cross-sectional right-side view of the automated transaction machine structure of FIG. 1.
Figure 5A:
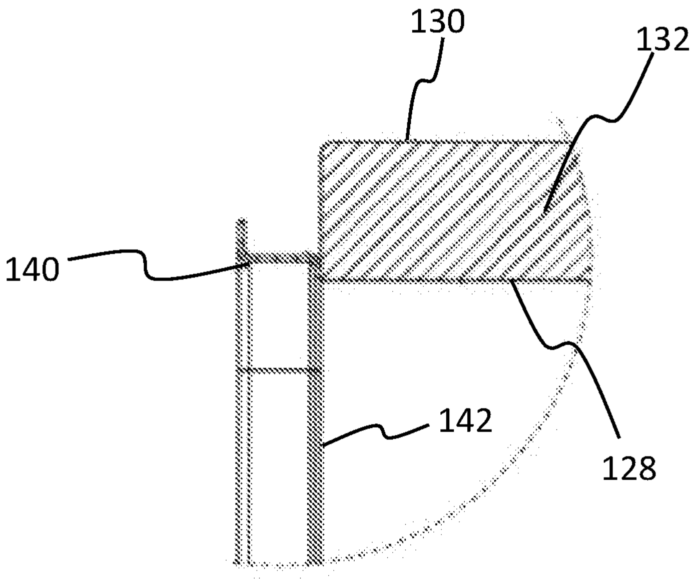
FIG. 5*a* is an enlarged view of a portion of FIG. 5.
Figure 5B:
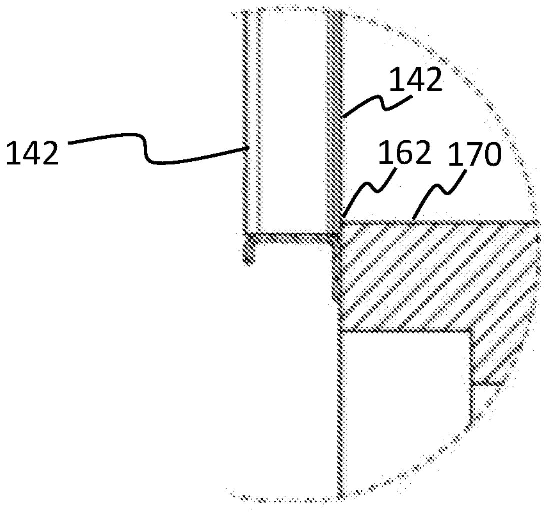
FIG. 5*b* is an enlarged view of another portion of FIG. 5.
Figure 6:
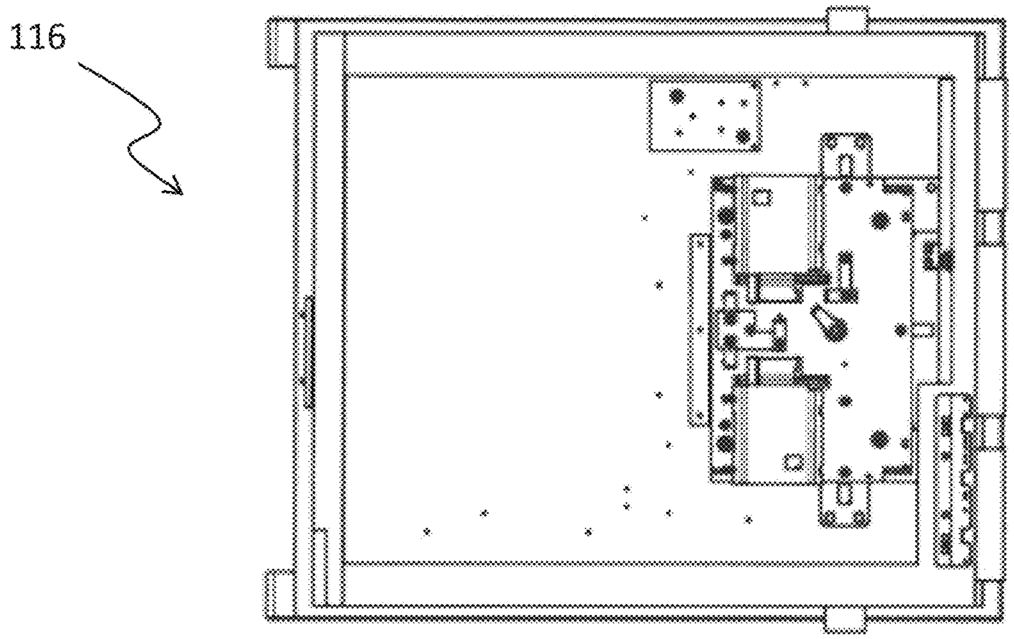
FIG. 6 is a rear view of the safe door of the automated transaction machine structure of FIG. 1 shown without the bolt cover.
Figure 7:
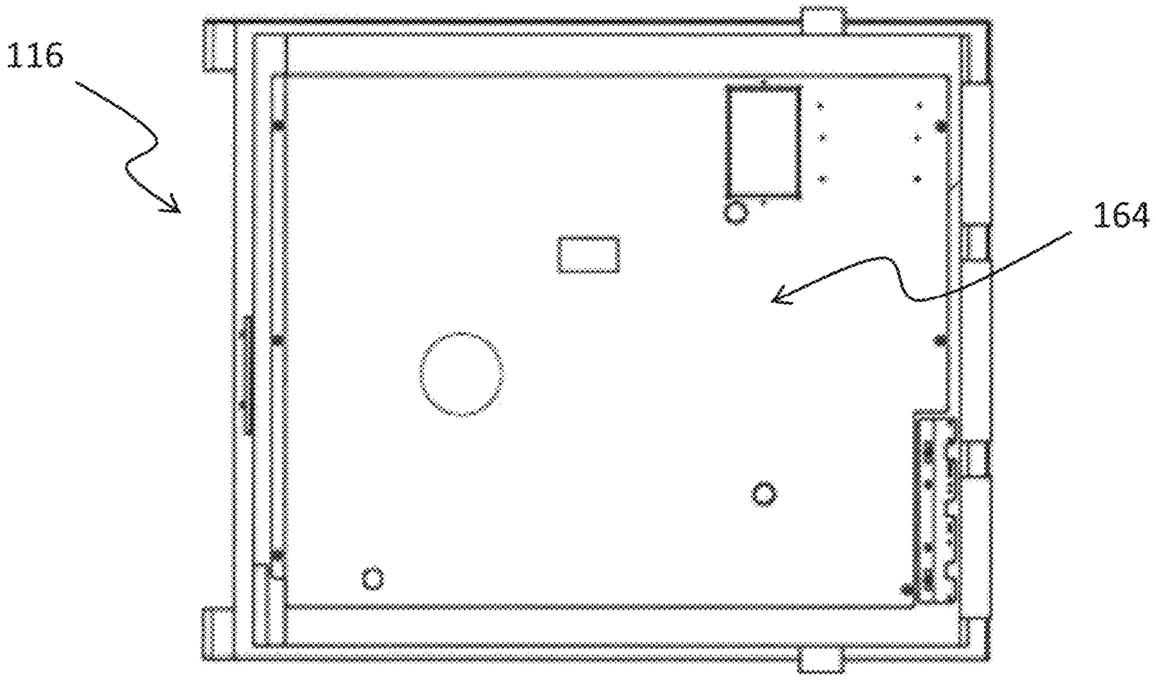
FIG. 7 is a view similar to FIG. 6, but showing the safe door including the bolt cover.
Figure 8:
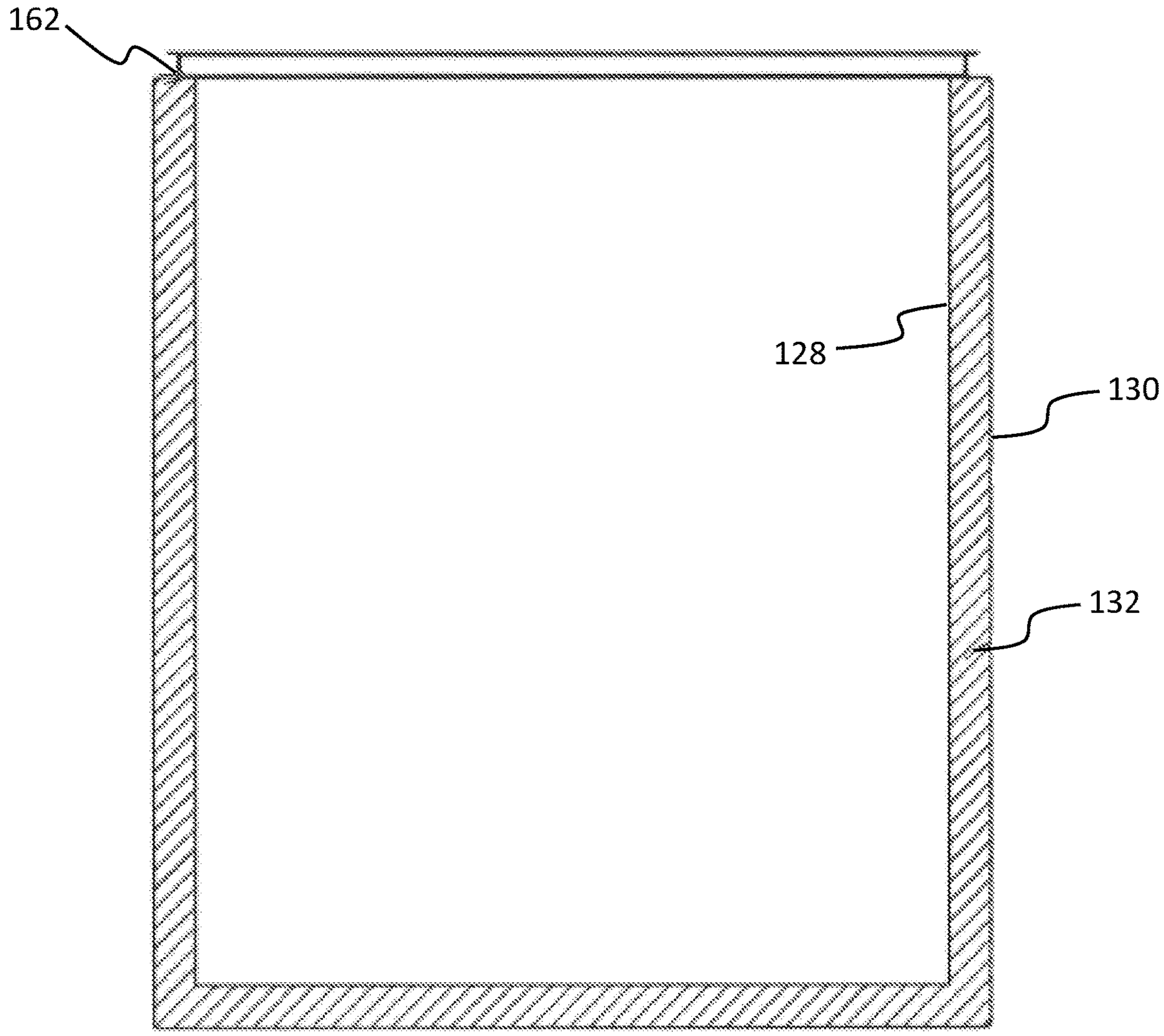
FIG. 8 is a cross sectional bottom view of the top wall of the upper unit of the automated transaction machine structure of FIG. 1.
Figure 9:
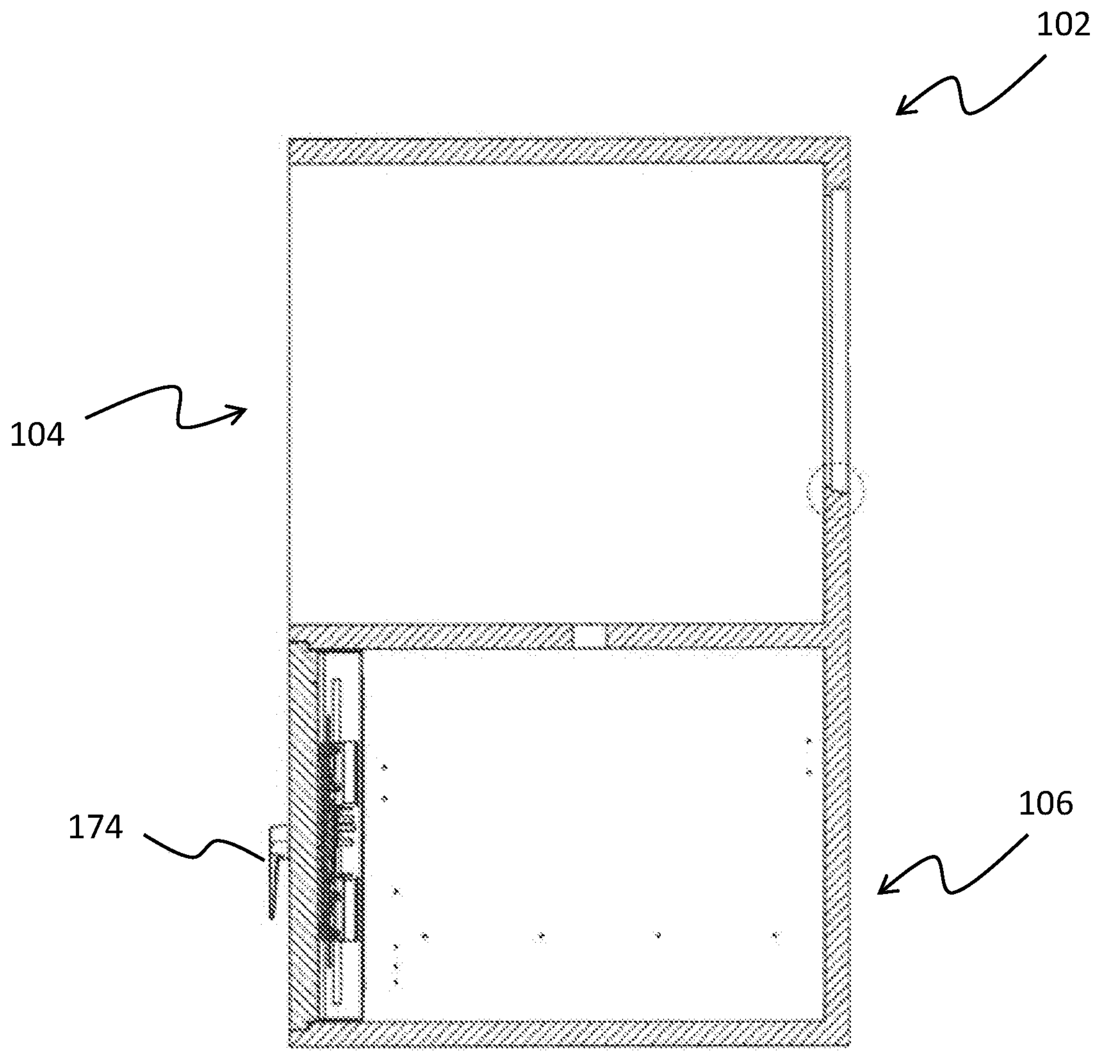
FIG. 9 is a partial cross-sectional right-side view of the automated transaction machine structure of FIG. 1.
Figure 9A:
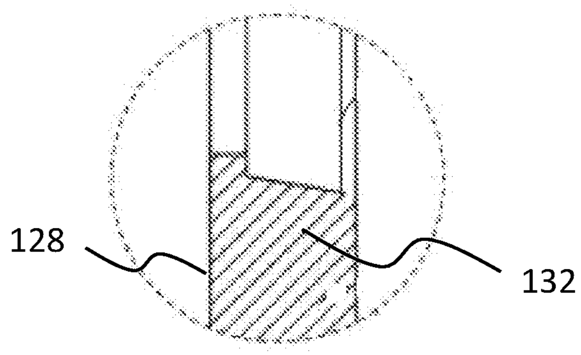
FIG. 9*a* is an enlarged view of a portion of FIG. 9.
Figure 10:
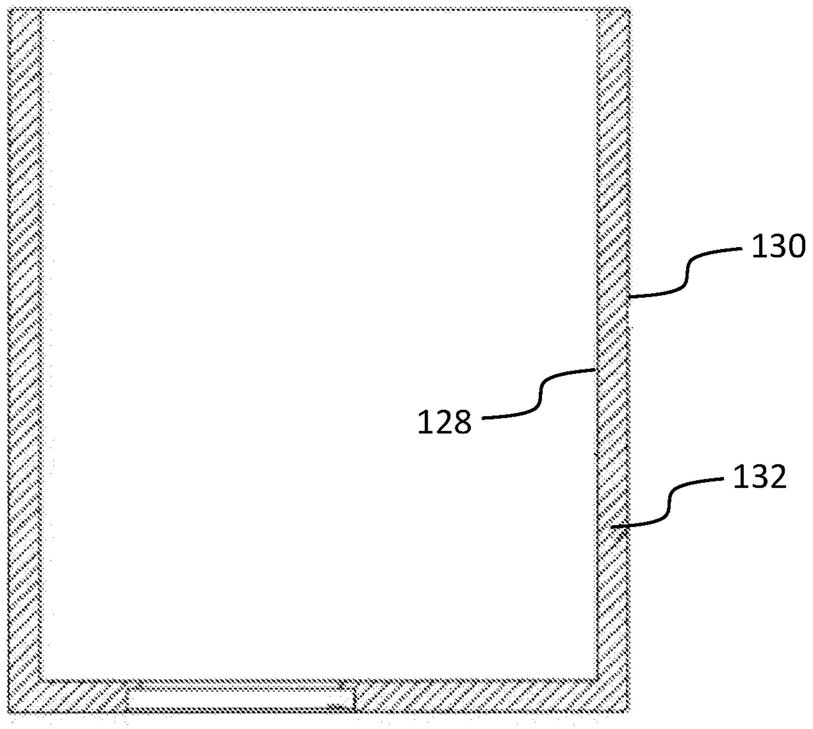
FIG. 10 is a cross sectional bottom view of the top wall of the upper unit of the automated transaction machine structure of FIG. 1.
Figure 10A:
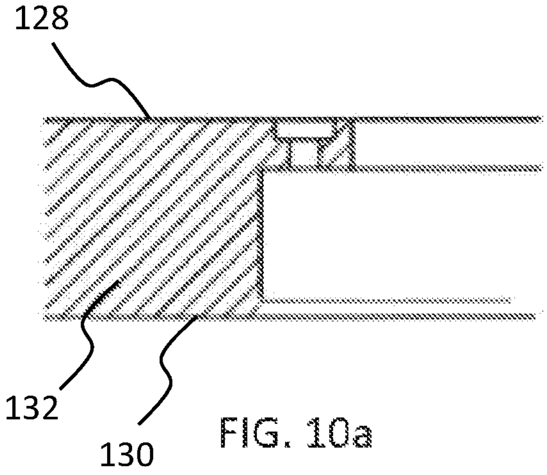
FIG. 10*a* is an enlarged view of a portion of FIG. 10.
Figure 11:
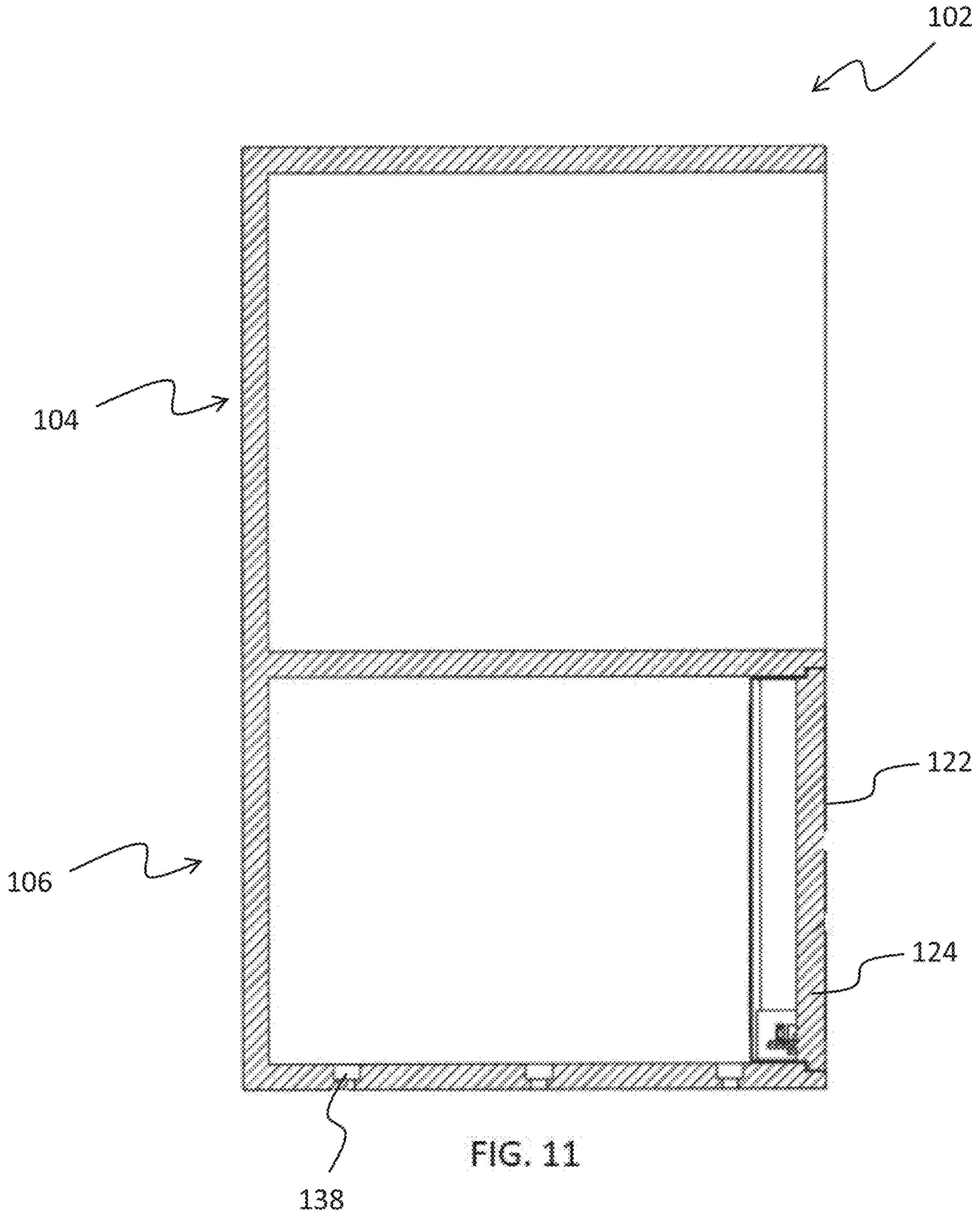
FIG. 11 is a partial cross-sectional right-side view of the automated transaction machine structure of FIG. 1.
Figure 12:
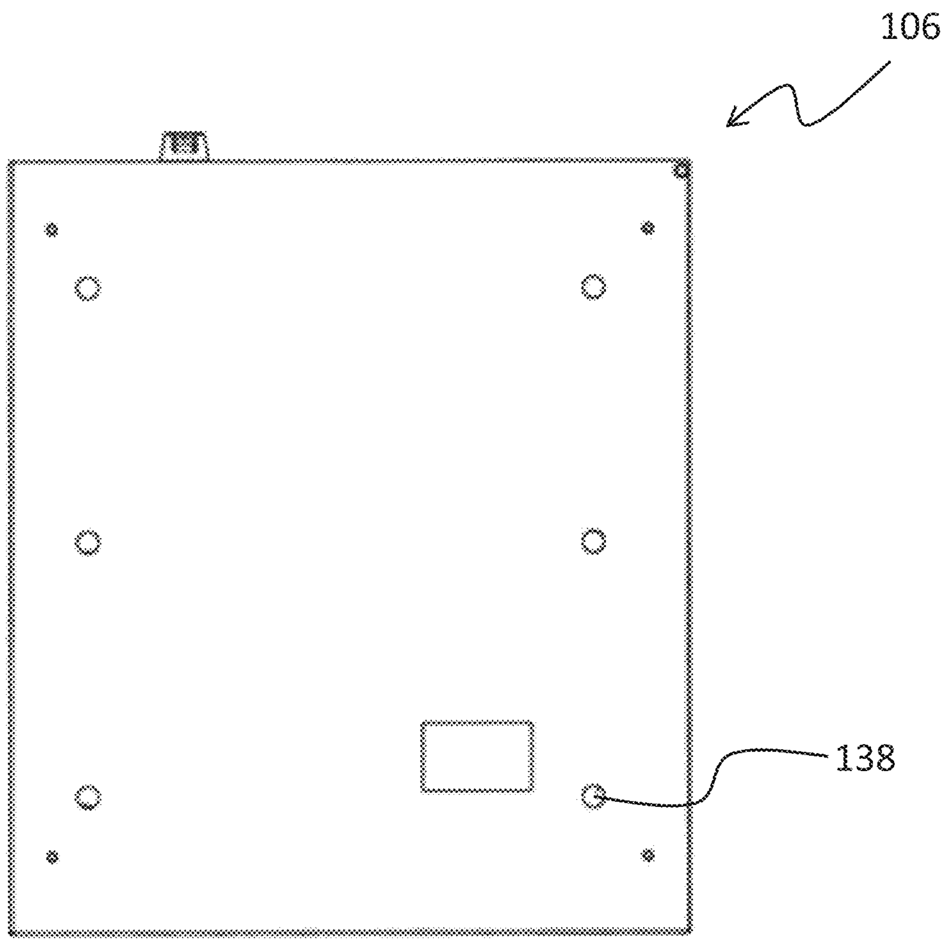
FIG. 12 is a bottom view of the lower unit of the automated transaction machine structure of FIG. 1.

Referring now to the drawings, there is illustrated in FIGS. 1-12 an embodiment of an automated transaction machine structure 102 including an upper unit 104 and a lower unit 106 with a central opening 108 for the passage of documents or other items between the upper unit 104 and the lower unit 106. The lower unit 106 includes a chest having a main body, the main body forming a chest cavity 118, and the main body having a lower unit interior wall 110 and a lower unit exterior wall 112. The lower unit interior wall 110 and lower unit exterior wall 112 are made of different metals, metal alloys, or composite metallic material, that, for example, may comply with both the UL and CEN standards for certain safes. In one exemplary embodiment, the metals are differing low carbon steels, for example of 3 mm in thickness. In another exemplary embodiment, the lower unit exterior wall 112 may be 303 stainless steel and the lower unit interior wall 110 may be low carbon steel, for example, each of 3 mm in thickness. The lower unit interior wall 110 and lower unit exterior wall 112 are separated by a layer of material 114 disposed therein, for example concrete, or other desired non-metallic material provided for security, thermal protection, and/or insulation. For further example, the material 114 may be a CEN IV rated aggregate.

The lower unit 106 may include the central opening 108 for passage of documents, such as but not limited to cash or checks, with the opening 108 being formed directly in the lower unit 106. Additionally, the lower unit 106 may include a door 116 for access to the chest cavity 118. The door 116 may be comprised of a door interior wall 120, a door exterior wall 122, and a material layer, such as concrete, 124 disposed between the door interior wall 120 and door exterior wall 122. The door 116 may include a handle 174. The door interior wall 120 and door exterior wall 122 may be comprised of two different metals. In one exemplary embodiment, the door exterior wall 122 is a stainless steel and the door interior wall 120 is a low carbon steel, each may be 3 mm in thickness.

The upper unit 104 includes a housing having a main body. The main body forms an upper unit cavity 126. The main body includes an upper unit interior wall 128 and an upper unit exterior wall 130. In one exemplary embodiment, there is disposed in the space between the upper unit interior wall 128 and the upper unit exterior wall 130 a material for insulation, security, and/or rigidity, for example an expandable foam, 132.

A transport system (not shown) may be disposed in the automated transaction machine structure 102 to transport documents through the central opening 108 between the upper unit 104 and the lower unit 106. In at least one embodiment, a fascia (not shown) is mounted to the automated transaction machine structure 102 and may be fixed to the upper unit 104 and include a user interface to conduct transactions.

In at least one embodiment the automated transaction machine structure 102 includes the door 116. In this embodiment the door 116 contains a horizontal gutter 140 along a top edge 144 of the door 116 as well as a vertical gutter 142 along side edges 146 of the door 116 to keep moisture, or other material, out of the lower unit 106.

In at least one embodiment the automated transaction machine structure 102 includes six fixed points 138 to the ground.

In at least one embodiment the automated transaction machine structure 102 includes an air conditioning or HVAC unit 148 in the upper unit 104. In at least one embodiment the air conditioning unit 148 is capable of regulating the climate in both the upper unit 104 and the lower unit 106.

In at least one embodiment the automated transaction machine structure 102 includes and the door 116 on the lower unit 106. In this embodiment, the door 116 includes several horizonal gutters 140 and vertical gutters 142 along the top edges 144 and side edges 146.

In at least one embodiment the automated transaction machine structure 102 includes a door stop 150 located on the door 116 of the lower unit 106. The door stop 150 may include a fixing material and a cable retractor. The door stop 150, as shown in this embodiment, may include a holder magnet 156 and holder magnet switch 158 to engage the door 116 in a desired position. The door stop 150 may further be fixed to the door 116 with a screw 160. In one embodiment, the screw 160 may be a cylinder head screw.

In at least one embodiment a sealing material, such as silicone caulk, 162 is disposed at the junction of a top wall and side wall of the upper unit 104 of an automated transaction machine structure 102. In at least one embodiment, the silicone caulk 162 may be 3-4 mm thick. The silicone caulk 162 may be applied to reduce gaps between the safe door 116 and vertical gutters 142 and horizontal gutters 140. Additionally, the silicone caulk 162 may help create a water-tight seal between the door 116 and the gutters 140 and 142. Further, in this or other embodiments, a sealing material, such as silicone caulk, 162 may be disposed at the junction of a side wall and bottom wall 170 of an automated transaction machine structure 102. In at least one embodiment the silicone caulk 162 may be 3-4 mm thick and is applied to reduce gaps and create a water-tight seal between the safe walls, including bottom wall 170, and gutters 140 and 142.

In at least one embodiment, the door 116 may include a bolt cover 164 to conceal various hardware, such as countersunk screws and base plates. The bolt cover 164 may be removable from the door 116.

What is claimed is:

1. An automated transaction machine structure comprising:

an upper unit including a housing having a main body, the main body forming a cavity, the main body having an upper unit interior wall and an upper unit exterior wall separated by an insulation material between the upper unit interior wall and the upper unit exterior wall, and the upper unit including components to interface with a user and conduct commercial transactions disposed in the cavity;

a lower unit including a main body, the main body forming a cavity, the main body having a lower unit interior wall and a lower unit exterior wall, the lower unit interior and lower unit exterior walls made of different metals, metal alloy, or composite metallic material, the lower unit interior and lower unit exterior walls separated by a layer of non-metallic material disposed therein, the lower unit forming a secure portion of the automated transaction machine structure; and an opening for the passage of items or documents between the upper and lower units;

wherein the upper space and the lower space form a common space between the upper unit and the lower unit between the upper unit and lower unit interior walls of the upper and lower units and the upper unit and lower unit exterior walls of the upper and lower units wherein the non-metallic material is concrete;

wherein the upper and lower unit exterior walls are a stainless-steel;

wherein the upper and lower unit interior walls are a low carbon steel; and where the insulation material is expandable foam.

2. The automated transaction machine structure of claim 1 wherein the lower unit includes a door to allow for selective access to the cavity of the lower unit.

3. The automated transaction machine structure of claim 2, wherein the door includes a horizontal gutter along a top edge.

4. The automated transaction machine structure of claim 3, wherein the top edge is sealed with silicone.

5. The automated transaction machine structure of claim 2, wherein the door includes a vertical gutter along at least one side edge.

6. The automated transaction machine structure of claim 5, wherein the side edge is sealed with silicone.

7. An automated transaction machine structure comprising:

an upper unit including a housing having a main body forming a cavity, the main body having an upper unit exterior wall and an upper unit interior wall with an upper space disposed between the upper unit exterior wall and the upper unit interior wall;

a lower unit including a main body, the main body forming a cavity, the main body having a lower unit interior wall and lower unit exterior wall with a lower space disposed between the lower unit interior wall and the lower unit exterior wall; and an opening for passage of documents or items between the upper unit and lower unit, wherein the upper space and the lower space form a common space between the upper unit and the lower unit between the upper unit and lower unit interior walls of the upper and lower units and the upper unit and lower unit exterior walls of the upper and lower units, and there is disposed in the common space non-metallic materials;

wherein the non-metallic material in the lower space is concrete;

wherein the upper unit and lower unit exterior walls are a stainless-steel;

wherein the upper unit and lower unit interior walls are a low carbon steel; and wherein the non-metallic material in the upper space is an insulation material.

8. The automated transaction machine structure of claim 7 wherein the lower unit includes a door for restricting access to the cavity of the lower unit.

9. The automated transaction machine structure of claim 8, wherein the door includes a horizontal gutter along a top edge.

10. The automated transaction machine structure of claim 9, wherein the top edge is sealed with silicone.

11. The automated transaction machine structure of claim 8, wherein the door includes a vertical gutter along at least one side edge.

12. The automated transaction machine structure of claim 11, wherein the side edge is sealed with silicone.

* * * * *